(12) United States Patent
Zhang et al.

(10) Patent No.: US 11,954,899 B2
(45) Date of Patent: Apr. 9, 2024

(54) SYSTEMS AND METHODS FOR TRAINING MODELS TO PREDICT DENSE CORRESPONDENCES IN IMAGES USING GEODESIC DISTANCES

(71) Applicant: Google LLC, Mountain View, CA (US)

(72) Inventors: Yinda Zhang, Daly City, CA (US); Feitong Tan, Beijing (CN); Danhang Tang, West Hollywood, CA (US); Mingsong Dou, Cupertino, CA (US); Kaiwen Guo, Zurich (CH); Sean Ryan Francesco Fanello, San Francisco, CA (US); Sofien Bouaziz, Los Gatos, CA (US); Cem Keskin, San Francisco, CA (US); Ruofei Du, San Francisco, CA (US); Rohit Kumar Pandey, Mountain View, CA (US); Deqing Sun, Cambridge, MA (US)

(73) Assignee: GOOGLE LLC, Moutain View, CA (US)

(*) Notice: Subject to any disclaimer, the term of this patent is extended or adjusted under 35 U.S.C. 154(b) by 0 days.

(21) Appl. No.: 18/274,371

(22) PCT Filed: Mar. 11, 2021

(86) PCT No.: PCT/CN2021/080137
§ 371 (c)(1),
(2) Date: Jul. 26, 2023

(87) PCT Pub. No.: WO2022/188086
PCT Pub. Date: Sep. 15, 2022

(65) Prior Publication Data
US 2024/0046618 A1    Feb. 8, 2024

(51) Int. Cl.
*G06V 10/771*    (2022.01)
*G06T 7/70*    (2017.01)
(Continued)

(52) U.S. Cl.
CPC ............ *G06V 10/771* (2022.01); *G06T 7/70* (2017.01); *G06T 17/00* (2013.01); *G06V 10/44* (2022.01);
(Continued)

(58) Field of Classification Search
CPC . G06T 2207/20084; G06T 2207/20081; G06T 7/11; G06T 7/70;
(Continued)

(56) References Cited

U.S. PATENT DOCUMENTS

2016/0163058 A1* 6/2016 Wei .................. G06V 10/25
                                                    382/171
2019/0026917 A1    1/2019 Liao et al.
(Continued)

FOREIGN PATENT DOCUMENTS

| CN | 109389156 A | 2/2019 |
|----|-------------|--------|
| CN | 111401521 A | 7/2020 |

(Continued)

OTHER PUBLICATIONS

The International Search Report and The Written Opinion for PCT/CN2021/080137, dated Dec. 8, 2021.
(Continued)

*Primary Examiner* — Ian L Lemieux
(74) *Attorney, Agent, or Firm* — Botos Churchill IP Law LLP

(57) ABSTRACT

Systems and methods for training models to predict dense correspondences across images such as human images. A model may be trained using synthetic training data created from one or more 3D computer models of a subject. In addition, one or more geodesic distances derived from the surfaces of one or more of the 3D models may be used to generate one or more loss values, which may in turn be used in modifying the model's parameters during training.

20 Claims, 8 Drawing Sheets

(51) Int. Cl.
  *G06T 17/00* (2006.01)
  *G06V 10/44* (2022.01)
  *G06V 10/75* (2022.01)

(52) U.S. Cl.
  CPC .. *G06V 10/751* (2022.01); *G06T 2207/20081* (2013.01); *G06T 2207/20084* (2013.01)

(58) Field of Classification Search
  CPC ... G06T 2207/30196; G06T 5/20; G06T 7/73; G06T 19/006; G06T 2207/20016; G06T 7/143; G06T 7/0012; G06T 7/10; G06T 17/00; G06T 2207/10028; G06T 3/40; G06T 7/50; G06T 7/33; G06T 7/75; G06T 2207/10024; G06T 19/20; G06T 2207/10012; G06T 2207/20132; G06T 7/40; G06T 7/49; G06T 2207/10004; G06T 2207/20228; G06T 2207/30124; G06T 7/246; G06T 7/593; G06T 15/10; G06T 2200/04; G06T 2200/08; G06T 2207/10056; G06T 2207/20221; G06T 2207/30024; G06T 2207/30036; G06T 2207/30096; G06T 2207/30201; G06T 2207/30252; G06T 5/50; G06T 7/20; G06T 1/20; G06T 15/005; G06T 17/10; G06T 17/20; G06T 2207/20076; G06T 2207/30012; G06T 2207/30016; G06T 2207/30041; G06T 2207/30168; G06T 2207/30261; G06T 3/0018; G06T 5/005; G06T 7/0014; G06T 7/194; G06T 7/41; G06T 7/529; G06T 7/60; G06T 15/08; G06T 2207/10016; G06T 2207/10116; G06T 2207/10132; G06T 3/4038; G06T 3/4053; G06T 7/269; G06T 7/30; G06T 7/80; G06V 10/82; G06V 10/771; G06V 10/44; G06V 10/764; G06V 10/454; G06V 40/171; G06V 10/25; G06V 10/7715; G06V 40/162; G06V 2201/07; G06V 10/751; G06V 10/40; G06V 10/774; G06V 10/806; G06V 20/64; G06V 20/647; G06V 2201/031; G06V 40/11; G06V 10/761; G06V 10/776; G06V 2201/03; G06V 10/225; G06V 10/46; G06V 10/255; G06V 10/74; G06V 20/70; G06V 10/42; G06V 10/467; G06V 10/54; G06V 10/56; G06V 10/803; G06V 10/945; G06V 10/993; G06V 20/00; G06V 20/52; G06V 20/56; G06V 20/58; G06V 40/10; G06V 40/28; G06V 10/26; G06V 10/98; G06V 2201/10; G06V 40/168; G06V 40/172; G06N 3/08; G06N 3/045; G06N 3/047; G06N 3/084; G06N 3/082; G06N 3/02; G06N 3/0464; G06N 3/04; G06N 3/088; G06N 3/044; G06N 3/048; G06N 5/046; G06F 18/211; G06F 18/2413

See application file for complete search history.

(56) References Cited

U.S. PATENT DOCUMENTS

2021/0390776 A1* 12/2021 Wang .................. G06N 3/08
2022/0156528 A1*  5/2022 Borse .................. G06V 10/26

FOREIGN PATENT DOCUMENTS

| | | |
|---|---|---|
| CN | 111915555 A | 11/2020 |
| CN | 112016677 A | 12/2020 |
| KR | 20180087994 A | 8/2018 |

OTHER PUBLICATIONS

Bogo, et al., "Keep it SMPL: Automatic Estimation of 3D Human Pose and Shape from a Single Image", 2016, arXiv:1607.08128v1, pp. 1-18.

Güler, et al., "DensePose: Dense Human Pose Estimation In The Wild", 2018, arXiv:1802.00434v1, 12 Pages.

He, et al., "GeoNet: Deep Geodesic Networks for Point Cloud Analysis", 2019, arXiv:1901.00680v1, 10 Pages.

Li, et al., "3D Human Avatar Digitization From a Single Image", VRCAI, 2019, 9 Pages.

Mahendran, et al., "3D Pose Regression Using Convolutional Neural Networks", Computer Vision Foundation, 2017, pp. 2174-2182.

Massa, "Relating Images and 3D Models With Convolutional Neural Networks", Signal and Image Processing. Université Paris-Est, 2017. English. NNT : 2017PESC1198, HAL Id: tel-01762533, https://pastel.archives-ouvertes.fr/tel-01762533, 136 Pages.

Mitchell, et al., "The Discrete Geodesic Problem", Siam J. Comput., vol. 16, No. 4, 1987, pp. 647-668.

Omran, et al., "Neural Body Fitting: Unifying Deep Learning and Model-Based Human Pose and Shape Estimation", arXiv:1808.05942v1, 2018, pp. 1-13.

Pickup, et al., "Shape Retrieval of Non-rigid 3D Human Models", International Journal of Computer Vision, 2016, vol. 120, pp. 169-193.

Saito, et al., "PIFu: Pixel-Aligned Implicit Function for High-Resolution Clothed Human Digitization", 2019, arXiv:1905.05172v3, pp. 1-15.

Tan, et al., "Indirect Deep Structured Learning for 3D Human Body Shape and Pose Prediction", 2017, 11 Pages.

Tung, et al., "Self-supervised Learning of Motion Capture", 31st Conference on Neural Information Processing Systems, 2017, pp. 1-11.

Varol, et al., "BodyNet: Volumetric Inference of 3D Human Body Shapes", 2018, arXiv:1804.04875v1, pp. 1-27.

Varol, et al., "BodyNet: Volumetric Inference of 3D Human Body Shapes", 2018, arXiv:1804.04875v2, pp. 1-27.

Varol, et al., "BodyNet: Volumetric Inference of 3D Human Body Shapes", 2018, arXiv: 1804.04875v3, pp. 1-27.

Yang, et al., "Continuous Geodesic Convolutions for Learning on 3D Shapes", 2020, arXiv:2002.02506v1, 12 Pages.

* cited by examiner

402

Generate a first image and a first surface map from a 3D model

404

Generate a second image from the 3D model that is different from the first image (e.g., because the 3D model is in a different pose or different lighting, the image is generated from a different virtual camera position, etc.)

406

Generate a first feature map from the first image and a second feature map from the second image

408

Determine a first feature distance between a first point as represented in the first feature map and a second point as represented in the second feature map, the first point and the second point corresponding to the same feature on the 3D model

410

Determine a first loss value of a set of loss values based on the first feature distance 400a

Determine a second feature distance between a third point as represented in the first feature map and a fourth point as represented in the first feature map

414

Determine a third feature distance between the third point as represented in the first feature map and a fifth point as represented in the first feature map

416

Determine a first geodesic distance between the third point and the fourth point as represented in a first surface map, the first surface map corresponding to the first image and having been generated using the 3D model

418

Determine a second geodesic distance between the third point and the fifth point as represented in the first surface map

420

Determine a second loss value of the set of loss values, the second loss value being based on the second feature distance, the third feature distance, the first geodesic distance, and the second geodesic distance

422

Modify one or more parameters of a neural network based at least in part on the set of loss values 400b

FIG. 4B

502 — Perform steps 402-420 of method 400a and 400b

504 — Determine a set of fourth feature distances between a sixth point as represented in the first feature map and all other points of the first image as represented in the first feature map 506 — Determine a set of third geodesic distances between the sixth point as represented in the first surface map, and all other points of the first image as represented in the first surface map 508 — Determine a third loss value of the set of loss values, the third loss value being based on the set of fourth feature distances and the set of third geodesic distances 510 — Perform step 422 of method 400b using the resulting set of loss values

Perform steps 402-420 of method 400a and 400b, and steps 504-508 of method 500

704

Determine a set of fifth feature distances between a seventh point as represented in the first feature map and all points of the second image as represented in the second feature map

706

Determine a set of fourth geodesic distances between a first point as represented in a second surface map and all points of the second image as represented in the second surface map, the second surface map corresponding to the second image and having been generated using the three-dimensional model, and the first point in the second surface map and the seventh point in the first feature map corresponding to the same feature on the three-dimensional model of the subject

708

Determine a fourth loss value of the set of loss values, the fourth loss value being based on the set of fifth feature distances and the set of fourth geodesic distances

710

Perform step 422 of method 400b using the resulting set of loss values

SYSTEMS AND METHODS FOR TRAINING MODELS TO PREDICT DENSE CORRESPONDENCES IN IMAGES USING GEODESIC DISTANCES

CROSS-REFERENCE TO RELATED APPLICATIONS

The present application is a national phase entry under 35 U.S.C. § 371 of International Application No. PCT/CN2021/080137, filed Mar. 11, 2021, published in English, the entire disclosure of which is incorporated herein by reference.

BACKGROUND

Various tasks in computer vision rely on a system being configured to identify correspondences across images. This can be especially difficult to accomplish in certain contexts, such as with images of human beings, which can vary widely based on a subject's body orientation, clothing, the angle of the camera, etc., and which can contain confusing similarities, such as between a subject's right and left hand. This can also be a challenge with other types subjects, such as animals, robotic or mechanical devices, etc. In some approaches, a model may be trained using images that are manually coded by human annotators to identify similar features (e.g., for images of a human, each image may be coded to identify eyes, ears, nose, shoulders, elbows, hands, etc.).

However, because it is not feasible for human annotators to identify every pixel in each reference image, and because humans may not be able to identify features precisely enough, models interpreting human-annotated training examples will generally have to be configured to draw additional conclusions by associating pixels surrounding each identified feature as being more likely to be associated with that feature. This can lead to incorrect associations being learned. For example, using human-annotated training data, if a human subject's head is tilted so that their cheek is resting on their shoulder, a nearest neighbor search may misidentify pixels of the subject's cheek as corresponding to the subject's shoulder, or vice versa. This can then lead to the model misunderstanding the human form in further images during inference. An additional drawback of using human-annotated training examples is the high cost of creating such training data.

BRIEF SUMMARY

The present technology concerns systems and methods for training models to predict dense correspondences across images such as human images. More specifically, the present technology provides for training a model using synthetic training data created from one or more three-dimensional computer models ("3D models") of a subject, e.g., 3D models of human subjects. In addition, the present technology provides for using one or more geodesic distances derived from the surfaces of one or more of the 3D models to generate one or more loss values to be used in modifying the model's parameters during training.

The present technology allows a virtually limitless amount and variety of training data to be created automatically, and additionally enables geodesic surface information from the 3D models to be integrated into the training data so that the predictive model can learn to accurately differentiate features in the two-dimensional images ("2D images") that might otherwise appear to be related. Predictive models trained according to the present technology thus may achieve significantly lower error rates in predicting correspondences between pairs of images, including between points (e.g., pixels) which are visible in both images, and in recognizing when a point visible in one image is occluded, and thus not visible, in the other image. In addition, predictive models trained according to the present technology may make fewer mistakes corresponding points on ambiguous features in both images (e.g., between a human subject's left and right hands). These benefits may be seen both in predicting correspondences between images of a single subject, and in predicting correspondences between images of two different subjects. In addition, predictive models trained according to the present technology can be integrated into other end-to-end network architectures which rely on predicting correspondences between images (e.g., models trained to perform motion estimation or "optical flow," human pose estimation, etc.), which can result in integrated models which display the benefits of the present technology and thus achieve better performance.

In one aspect, the disclosure describes a method of training a neural network to predict correspondences in images, the method comprising: generating, by one or more processors of a processing system and using the neural network, a first feature map based on a first image of a subject, and a second feature map based on a second image of the subject, the first image and the second image being different and having been generated using a three-dimensional model of the subject; determining, by the one or more processors, a first feature distance between a first point as represented in the first feature map and a second point as represented in the second feature map, the first point and the second point corresponding to the same feature on the three-dimensional model of the subject; determining, by the one or more processors, a second feature distance between a third point and a fourth point as represented in the first feature map; determining, by the one or more processors, a first geodesic distance between the third point and the fourth point as represented in a first surface map, the first surface map corresponding to the first image and having been generated using the three-dimensional model of the subject; determining, by the one or more processors, a third feature distance between the third point as represented in the first feature map and a fifth point as represented in the first feature map; determining, by the one or more processors, a second geodesic distance between the third point and the fifth point as represented in the first surface map; determining, by the one or more processors, a first loss value of a set of loss values, the first loss value being based on the first feature distance; determining, by the one or more processors, a second loss value of the set of loss values, the second loss value being based on the second feature distance, the third feature distance, the first geodesic distance, and the second geodesic distance; and modifying, by the one or more processors, one or more parameters of the neural network based at least in part on the set of loss values. In some aspects, the first loss value is further based on a set of additional feature distances, each given feature distance of the set of additional feature distances being between a selected point as represented in the first feature map and a corresponding point as represented in the second feature map, the selected point and the corresponding point corresponding to the same feature on the three-dimensional model of the subject. In some aspects, the first point and each selected point collectively represent all pixels in the first image. In some aspects, the second loss value is further based on at least one additional pair of feature distances and at least one additional pair of geodesic distances, each given additional pair of feature distances of the at least one additional pair of feature distances comprising two feature distances between a set of three selected points as represented in the first feature map, and each given additional pair of geodesic distances of the at least one additional pair of geodesic distances comprising two geodesic distances between the set of three selected points as represented in the first surface map. In some aspects, the method further comprises: determining, by the one or more processors, a set of fourth feature distances between a sixth point as represented in the first feature map and all other points of the first image as represented in the first feature map; determining, by the one or more processors, a set of third geodesic distances between the sixth point as represented in the first surface map, and all other points of the first image as represented in the first surface map; and determining, by the one or more processors, a third loss value of the set of loss values, the third loss value being based on the set of fourth feature distances and the set of third geodesic distances. In some aspects, the third loss value is further based on at least one additional set of feature distances and at least one additional set of geodesic distances, each given additional set of feature distances of the at least one additional set of feature distances being between a selected point as represented in the first feature map and all other points of the first image as represented in the first feature map, and each given additional set of geodesic distances of the at least one additional set of geodesic distances being between the selected point as represented in the first surface map and all other points of the first image as represented in the first surface map. In some aspects, the method further comprises: determining, by the one or more processors, a set of fourth feature distances between a sixth point as represented in the first feature map and all points of the second image as represented in the second feature map: determining, by the one or more processors, a set of third geodesic distances between a first point as represented in a second surface map and all points of the second image as represented in the second surface map, the second surface map corresponding to the second image and having been generated using the three-dimensional model of the subject, and the first point in the second surface map and the sixth point in the first feature map corresponding to the same feature on the three-dimensional model of the subject; and determining, by the one or more processors, a third loss value of the set of loss values, the third loss value being based on the set of fourth feature distances and the set of third geodesic distances. In some aspects, the third loss value is further based on at least one additional set of feature distances and at least one additional set of geodesic distances, each given additional set of feature distances of the at least one additional set of feature distances being between a selected point as represented in the first feature map and all points of the second image as represented in the second feature map, and each given additional set of geodesic distances of the at least one additional set of geodesic distances being between a corresponding point as represented in a second surface map and all points of the second image as represented in the second surface map, the corresponding point in the second surface map and the selected point in the first feature map corresponding to the same feature on the three-dimensional model of the subject. In some aspects, the method further comprises: determining, by the one or more processors, a set of fifth feature distances between a seventh point as represented in the first feature map and all points of the second image as represented in the second feature map; determining, by the one or more processors, a set of fourth geodesic distances between a first point as represented in a second surface map and all points of the second image as represented in the second surface map, the second surface map corresponding to the second image and having been generated using the three-dimensional model of the subject, and the first point in the second surface map and the seventh point in the first feature map corresponding to the same feature on the three-dimensional model of the subject; and determining, by the one or more processors, a fourth loss value of the set of loss values, the fourth loss value being based on the set of fifth feature distances and the set of fourth geodesic distances. In some aspects, the first point as represented in the second surface map corresponds to a feature on the three-dimensional model of the subject that is not represented in the second feature map. In some aspects, the method further comprises the one or more processors generating at least one of the first image, the second image, or the first surface map. In some aspects, the method further comprises the one or more processors generating at least one of the first image, the second image, the first surface map, or the second surface map. In some aspects, the subject is a human or a representation of a human. In some aspects, the subject is in a different pose in the first image than in the second image. In some aspects, the first image is generated from a different perspective of the three-dimensional model of the subject than the second image.

In another aspect, the disclosure describes a processing system comprising a memory storing a neural network, and one or more processors coupled to the memory and configured to use the neural network to predict correspondences in images, wherein the neural network has been trained to predict correspondences in images pursuant to a training method comprising: generating a first feature map based on a first image of a subject, and a second feature map based on a second image of the subject, the first image and the second image being different and having been generated using a three-dimensional model of the subject; determining a first feature distance between a first point as represented in the first feature map and a second point as represented in the second feature map, the first point and the second point corresponding to the same feature on the three-dimensional model of the subject: determining a second feature distance between a third point and a fourth point as represented in the first feature map; determining a first geodesic distance between the third point and the fourth point as represented in a first surface map, the first surface map corresponding to the first image and having been generated using the three-dimensional model of the subject; determining a third feature distance between the third point as represented in the first feature map and a fifth point as represented in the first feature map; determining a second geodesic distance between the third point and the fifth point as represented in the first surface map; determining a first loss value of a set of loss values, the first loss value being based on the first feature distance; determining a second loss value of the set of loss values, the second loss value being based on the second feature distance, the third feature distance, the first geodesic distance, and the second geodesic distance; and modifying one or more parameters of the neural network based at least in part on the set of loss values. In some aspects, the neural network has been trained to predict correspondences in images pursuant to a training method further comprising: determining a set of fourth feature distances between a sixth point as represented in the first feature map and all other points of the first image as represented in the first feature map: determining a set of third geodesic distances between the sixth point as represented in the first surface map, and all other points of the first image as represented in the first surface map; and determining a third loss value of the set of loss values, the third loss value being based on the set of fourth feature distances and the set of third geodesic distances. In some aspects, the neural network has been trained to predict correspondences in images pursuant to a training method further comprising: determining a set of fourth feature distances between a sixth point as represented in the first feature map and all points of the second image as represented in the second feature map: determining a set of third geodesic distances between a first point as represented in a second surface map and all points of the second image as represented in the second surface map, the second surface map corresponding to the second image and having been generated using the three-dimensional model of the subject, and the first point in the second surface map and the sixth point in the first feature map corresponding to the same feature on the three-dimensional model of the subject: and determining a third loss value of the set of loss values, the third loss value being based on the set of fourth feature distances and the set of third geodesic distances. In some aspects, the neural network has been trained to predict correspondences in images pursuant to a training method further comprising: determining a set of fifth feature distances between a seventh point as represented in the first feature map and all points of the second image as represented in the second feature map: determining a set of fourth geodesic distances between a first point as represented in a second surface map and all points of the second image as represented in the second surface map, the second surface map corresponding to the second image and having been generated using the three-dimensional model of the subject, and the first point in the second surface map and the seventh point in the first feature map corresponding to the same feature on the three-dimensional model of the subject; and determining a fourth loss value of the set of loss values, the fourth loss value being based on the set of fifth feature distances and the set of fourth geodesic distances.

BRIEF DESCRIPTION OF THE DRAWINGS

FIGS. 4A and 4B are a flow diagram showing an exemplary method for training a neural network to identify correspondences in images, according to aspects of the present technology.

FIG. 5 is a flow diagram showing an exemplary method for determining an additional loss value for combination with the loss values of method 400a, 400b of FIGS. 4A, 4B, according to aspects of the present technology.

FIG. 7 is a flow diagram showing an exemplary method for determining an additional loss value for combination with the loss values of methods 400a, 400b, and 500 of FIGS. 4A, 4B, and 5, according to aspects of the present technology.

DETAILED DESCRIPTION

The present technology will now be described with respect to the following exemplary systems and methods.

Figure 1:
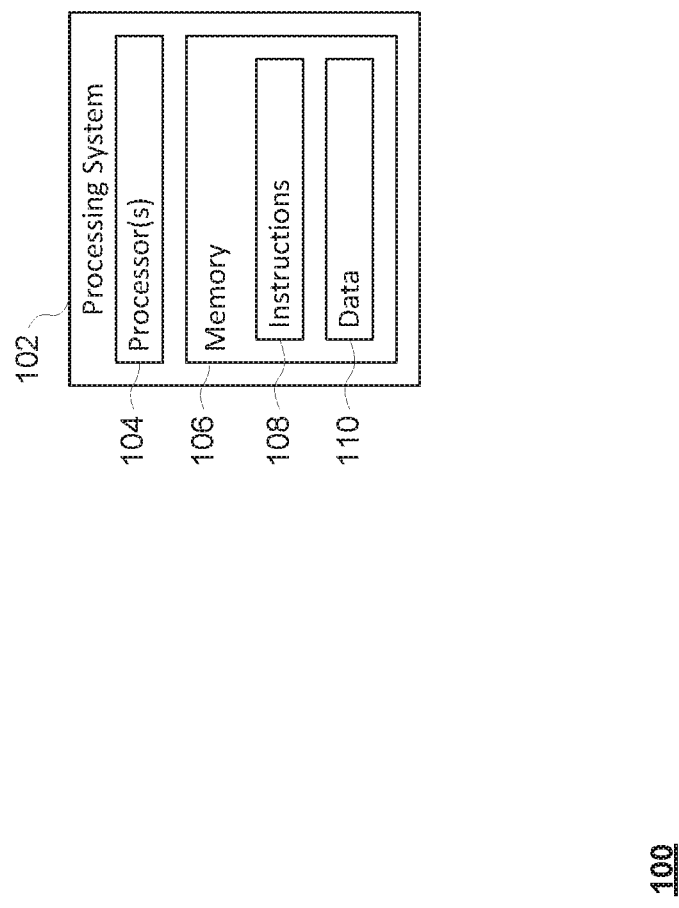
FIG. 1 is a functional diagram of an example system in accordance with aspects of the disclosure.

A high-level system diagram 100 of an exemplary processing system for performing the methods described herein is shown in FIG. 1. The processing system 102 may include one or more processors 104 and memory 106. Memory 106 stores information accessible by the one or more processors 104, including instructions 108 and data 110 that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. The instructions 108 and data 110 may include the predictive model, training data (e.g., 2D images and corresponding 3D model data), and the 3D models used to create the training data, as described herein.

Processing system 102 may be implemented on any type of computing device(s), such as any type of general computing device, server, or set thereof, and may further include other components typically present in general purpose computing devices or servers. Thus, processing system 102 may be resident on a single computing device such as a server, personal computer, or mobile device, and the models described herein may thus be local to that single computing device. Similarly, processing system 102 may be resident on a cloud computing system or other distributed system, such that predictive model, training data, and/or the 3D models used to create the training data described herein are distributed across two or more different physical computing devices.

Figure 2:
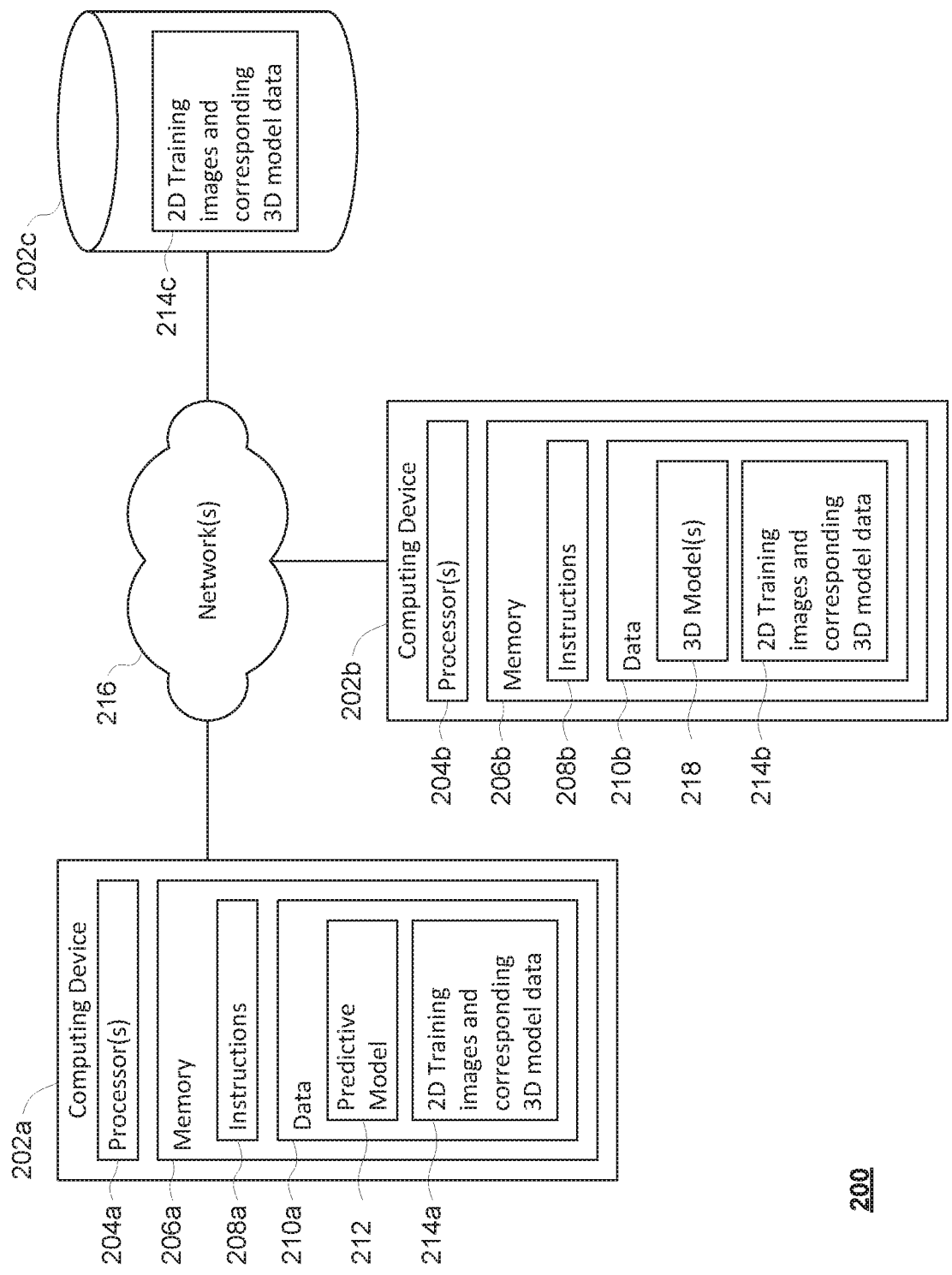
FIG. 2 is a functional diagram of an example system in accordance with aspects of the disclosure.

In this regard, FIG. 2 shows an additional high-level system diagram 200 in which an exemplary processing system 202 for performing the methods described herein is shown as comprising a first computing device 202a, a second computing device 202b, and a database 202c, each of which are connected to one another via one or more networks 216. First computing device 202a, second computing device 202b, and database 202c may each be single computing devices, or may be distributed across two or more different physical computing devices. As with the example of FIG. 1, first computing device 202a and second computing device 202b each include one or more processors (204a, 204b) and memory (206a, 206b) storing instructions (208a, 208b) and data (210a, 210b). Although not shown, database 202c may also include one or more processors and memory storing instructions and data.

As shown in the example of FIG. 2, the data 210a of first computing device 202a stores the predictive model 212, and the training data 214a, comprising 2D images and corresponding 3D model data, which is used to train the predictive model 212. The data 210b of second computing device 202b may store the one or more 3D models 218, and a set of training data 214b, comprising 2D images and corresponding 3D model data, which is created using the one or more 3D models 218. Finally, database 202c may also store a set of training data 214c, also comprising 2D images and corresponding 3D model data, which has been created by the second computing device 202b using the one or more 3D models 218. In this regard, the sets of training data 214a, 214b, and 214c may be identical to one another, or one or more may be subsets of another. For example, the second computing device 202b may be configured to create training data 214b from the one or more 3D models 218, and communicate that training data to database 202c to be stored in a master set 214c. In turn, first computing device 202a may be configured to obtain some or all of the training data 214c from database 202c, and store it locally in its memory 206a as training data 214a for use in training predictive model 212.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

As shown in the example of FIG. 2, the data 210a of first computing device 202a stores the predictive model 212, and the training data 214a, comprising 2D images and corresponding 3D model data, which is used to train the predictive model 212. The data 210b of second computing device 202b may store the one or more 3D models 218, and a set of training data 214b, comprising 2D images and corresponding 3D model data, which is created using the one or more 3D models 218. Finally, database 202c may also store a set of training data 214c, also comprising 2D images and corresponding 3D model data, which has been created by the second computing device 202b. In this regard, the sets of training data 214a, 214b, and 214c may be identical to one another, or one or more may be subsets of another. For example, the second computing device 202b may be configured to create training data 214b from the one or more 3D models 218, and communicate that training data to database 202c to be stored in a master set 214c. In turn, first computing device 202a may be configured to obtain some or all of the training data 214c from database 202c, and store it locally in its memory 206a as training data 214a for use in training predictive model 212.

Figure 3:
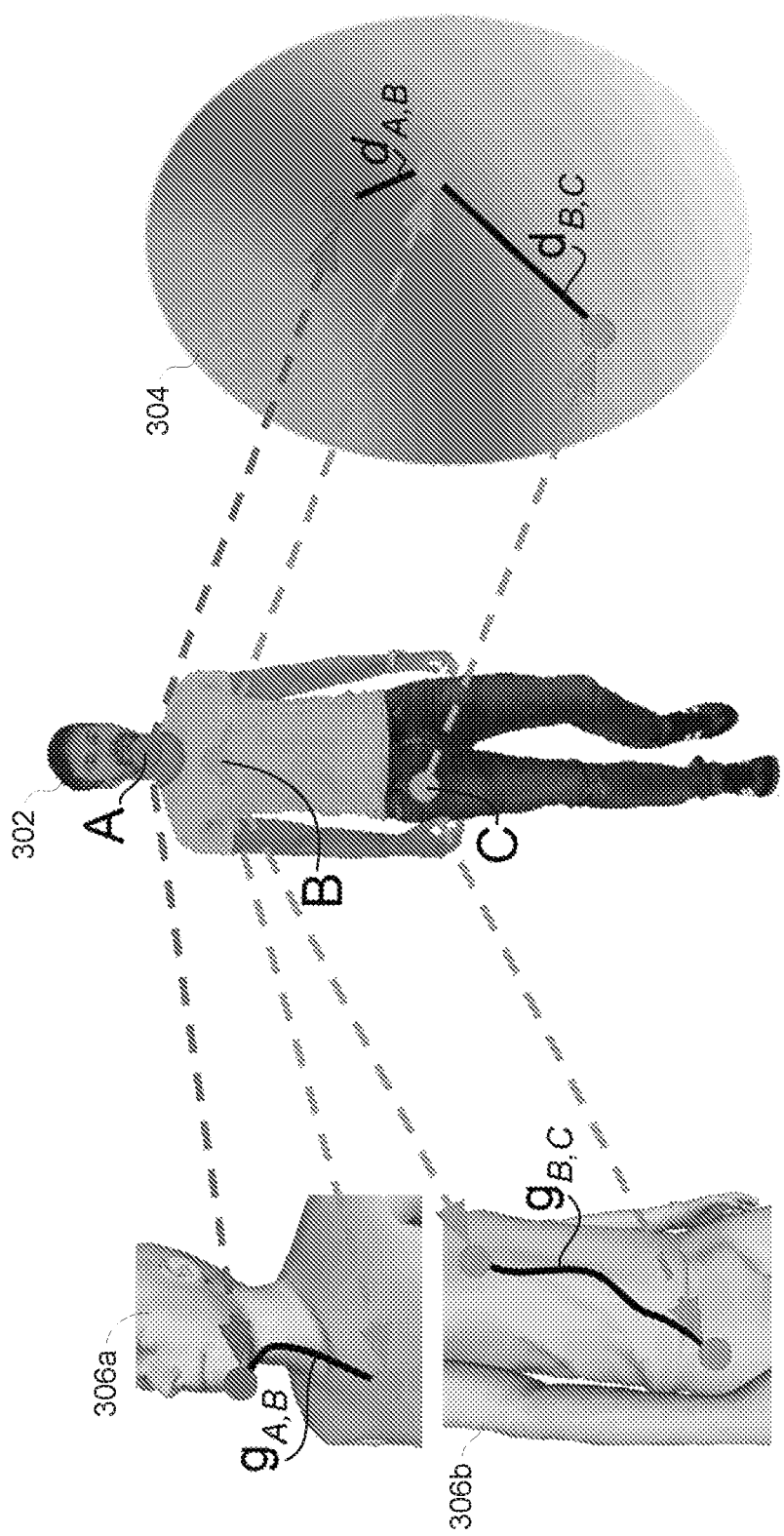
FIG. 3 is a diagram illustrating how points in a given 2D image may be represented in a corresponding feature map and 3D surface map.

FIG. 3 illustrates how points in a given 2D image may be represented in a corresponding feature map and 3D surface map. In that regard, FIG. 3 shows a 2D image 302 which has been generated from a 3D model (not shown) of a human subject. The 3D model may also be used to generate a corresponding surface map 306 of the subject in the same pose as used to generate the 2D image 302. Two excerpts 306a and 306b of the full 3D surface map 306 are depicted in FIG. 3. Image 302 may be processed, e.g., by a learned embedding function, to generate a feature map 304. While the feature map 304 is illustrated pictorially in FIG. 3, in practice it may take any suitable form and dimensionality, e.g., databases, tensors, vectors, etc. For example, for an image with a height in pixels of H, a width in pixels of W, the feature map F may be expressed according to Equation 1, below:

$$F \in \mathbb{R}^{H \times W \times C} \quad (1)$$

In such a case, each pixel of an image will be represented in feature map F as a vector of dimensionality C, which may be any suitable whole number (e.g., 1, 16, etc.).

In the example of FIG. 3, three points A, B, and C are identified in each of the 2D image 302, feature map 304, and 3D surface map excerpts 306a and/or 306b. Here again, while the points are illustrated pictorially in feature map 304, in practice these points may instead be represented as separate values in a database, or different elements in a tensor or vector. As can be seen, feature map 304 can be used to determine a first feature distance $d_{A,B}$ between point A and point B, and a second feature distance $d_{B,C}$ between point B and point C. These feature distances may be determined using any suitable equation. For example, if each point of 2D image 302 is represented in feature map 304 as a separate vector, then the feature distance between the vectors representing points A and B may be determined by calculating a dot-product of the two vectors, by calculating a cross-product of the two vectors, by adding the two vectors, by subtracting the two vectors, etc. In that regard, for a feature map F as described above with respect to Equation 1, the feature distance d between a point p in image $I_1$ and a point q in image $I_2$ may be calculated according to Equation 2, below:

$$d(p,q) = 1 - F_1(p) \cdot F_2(q) \quad (2)$$

In some aspects, the feature vectors $F_1(p)$ and $F_2(q)$ representing point p in image $I_1$ and point q in image $I_2$, respectively, may first be normalized so that they are unit vectors.

Likewise, 3D surface map 306 may be used to determine a first geodesic distance $g_{A,B}$ between point A and point B, and a second geodesic distance $g_{B,C}$ between point B and point C. The geodesic distances represent the distance between those points as measured along the 3D surface, and may be determined according to any suitable equation or method for calculating (or estimating) the shortest distance between those points on the 3D surface.

FIGS. 4A and 4B depict an exemplary method 400a, 400b showing how a neural network may be trained by a processing system (e.g., processing system 102 or 202) to identify correspondences in images. In that regard, in step 402, a first image and a first surface map are generated from a 3D model of the subject. Likewise, in step 404, a second image that is different from the first image is generated from the 3D model. The first image may be generated in a first pose and/or from a first camera orientation, and the corresponding first surface map will represent at least the surface of the 3D model in that first pose. The second image may be generated in any way that creates an image different than the first image. For example, the second image may be generated from placing the 3D model in a second pose, by imaging the 3D model from a different perspective (e.g., generating the image from a different virtual camera position), by subjecting the 3D model to different lighting conditions than that used to generate the first image, etc. The first image, first surface map, and second image may be generated by the processing system used to train the neural network (e.g., processing system 102 or 202), or may be generated by a separate system and provided to the processing system that trains the neural network.

In step 406, the processing system generates a first feature map from the first image and a second feature map from the second image. As explained above with respect to FIG. 3, the processing system may generate the feature maps in any suitable way. For example, the processing system may use a learned embedding function to generate a database, vector, or tensor that includes an entry, element, or other value representing each point (e.g., pixel) in the given image.

In step 408, the processing system determines a first feature distance between a first point as represented in the first feature map and a second point as represented in the second feature map, the first point and the second point corresponding to the same feature on the 3D model. For example, where the first and second image are of a human subject, the first point in the first image and the second point in the second image may both correspond to the tip of the subject's right index finger. In addition, where each point of the first image and the second image are represented as vectors in the first and second feature maps, respectively, the first feature distance may be determined as described above with respect to Equation 2 using the vector representing the first point in the first feature map and the vector representing the second point in the second feature map. Likewise, as described above, the first feature distance may be determined using any other suitable equation, such as by calculating a straight dot product of these two vectors, by calculating a cross-product of these two vectors, by adding the two vectors, by subtracting the two vectors, etc.

In step 410, the processing system determines a first loss value of a set of loss values based on the first feature distance. This first loss value may be determined according to any suitable equation. Likewise, this first loss value may be determined for any number of pairs of points in the first image and the second image. For example, the first loss value may be a consistency loss value $L_c$ calculated according to Equation 3 below, in which a feature distance d is calculated between every point p (out of n total points) in the first image and the corresponding point corr(p) in the second image.

$$L_c(p) = \sum_{p=1}^{n} d(p, \text{corr}(p)) \quad (3)$$

In the example of Equation 3, loss value $L_c$ is calculated based on the first feature distance, and all other feature distances between pairs of corresponding points in the first image and the second image. In that regard, the relationship between each point p and its corresponding point corr(p) in the second image may be determined by the processing system by correlating each point p to a corresponding point of the 3D model, and then correlating that point of the 3D model to the corresponding corr(p) in the second image. In addition, in some aspects, the training data may further include a list or other data structure identifying all corresponding point pairs so that the processing system need not make these determinations.

In step 412 (FIG. 4B), the processing system determines a second feature distance between a third point as represented in the first feature map and a fourth point as represented in the first feature map. Likewise, in step 414, the processing system determines a third feature distance between the third point as represented in the first feature map and a fifth point as represented in the first feature map. For example, the third point may be any randomly selected reference point $p_r$ in the first image, and the fourth and fifth points may be any other randomly selected points $p_a$ and $p_b$, respectively, in the first image. Here again, if each point of the first image is represented as a vector in the first feature map, the second and third feature distances may be determined as described above with respect to Equation 2. Likewise, as described above, the second and third feature distances may be determined using any other suitable equation, such as by calculating a straight dot product of each pair of vectors, by calculating a cross-product of each pair of vectors, by adding each pair of vectors, by subtracting each pair of vectors, etc. In some aspects, the equation used to calculate the second and third feature distances may be different than the equation used to calculate the first feature distance.

In step 416, the processing system determines a first geodesic distance between the third point and the fourth point as represented in a first surface map. Likewise, in step 418, the processing system determines a second geodesic distance between the third point and the fifth point as represented in the first surface map. The first surface map corresponds to the first image, having been generated using the 3D model of the subject in the same pose used to generate the first image. Thus, using the exemplary points called out in the description of steps 412 and 414, the third point represented in the first surface map will correspond to point $p_r$ represented in the first image, and the fourth and fifth points in the first surface map will correspond to points $p_a$ and $p_b$, respectively, in the first image. In such a case, the first and second geodesic distances $g(p_r, p_a)$ and $g(p_r, p_b)$, respectively, represent the distance between those points as measured along the 3D surface of the first surface map.

In step 420, the processing system determines a second loss value of a set of loss values based on the second feature distance, the third feature distance, the first geodesic distance, and the second geodesic distance. For example, the second loss value may be configured to encourage the order in the feature space of two points $p_a$ and $p_b$ with respect to a reference point $p_r$ to be the same as the order as measured by the corresponding geodesic distances, such that pairs of points physically apart on the 3D surface tend to have larger feature distances. This second loss value may be determined according to any suitable equation. For example, the second loss value may be based on a difference between the second and third feature distances, and may further be based on the sign (also referred to as the signum or sgn function) of the difference between the first and second geodesic distances. In that regard, the second loss value may be a sparse geodesic loss value $L_s$ calculated according to Equations 4 and 5 below.

$$L_s = \log(1+\exp(s \cdot (d(p_r,p_a)-d(p_r,p_b)))) \quad (4)$$

$$s = \mathrm{sgn}(g(p_r,p_a)-g(p_r,p_b)) \quad (5)$$

Likewise, this second loss value may be based on more than one triplet $\{p_r, p_a, p_b\}$ in the first image. Thus, the second loss value may be a value, vector, or tensor which is based on the loss value $L_s$ calculated according to Equations 4 and 5 using the second and third feature distances and the first and second geodesic distances, as well as additional loss values $L_s$ calculated for other randomly selected triplets. For example, the second loss value may be an average of the loss values $L_s$ calculated for a predetermined number of randomly selected triplets, e.g., 1, 16, 128, etc. Likewise, the second loss value may be determined by concatenating the loss values $L_s$ calculated for a predetermined number of randomly selected triplets.

In step 422, the processing system modifies one or more parameters of a neural network based at least in part on the set of loss values. In this regard, the neural network may be any model being trained to predict dense correspondences across images (e.g., predictive model 212). The set of loss values may be used in any suitable manner to influence the modification of the one or more parameters of the neural network. In that regard, the processing system may sum the first and second loss values to arrive at a total loss value, and modify the predictive model's parameters based on that total loss value. Likewise, the first and second loss values (or sets thereof) may be multiplied by one or more preselected weighting factors (e.g., a specific $w_e$ and $w_s$ value) before being combined to form the total loss value. In some aspects, the processing system may be configured to use each total loss value immediately after each training example, applying it during back-propagation to tune the parameters of the model, and then calculating a new total loss value during the next training example. In some aspects, the processing system may be configured to batch multiple training examples. In such a case, the processing system may be configured to combine (e.g., sum or average) the loss values calculated during each training example in the batch, apply the combined total loss value during a back-propagation phase following the conclusion of the batch, and then calculate a new combined total loss value during the next batch of training examples.

FIG. 5 depicts an exemplary method 500 of determining an additional loss value for combination with the loss values of method 400a, 400b of FIG. 4. In that regard, in step 502, the processing system performs steps 402-420 of method 400a and 400b, as described above.

In step 504, the processing system determines a set of fourth feature distances between a sixth point as represented in the first feature map and all other points of the first image as represented in the first feature map. The sixth point may be any randomly selected reference point $p_r$ in the first image. The label $p_r$ is used for convenience, and does not indicate that this randomly selected reference point must be the same as the reference point used in step 412 of method 400b. Here again, if each point of the first image is represented as a vector in the first feature map, the set of fourth feature distances may be determined as described above with respect to Equation 2. In that regard, the set of fourth feature distances will include a separate feature distance $d(p_r,p_i)$ for every point $p_i$ of the first image, calculated using the vectors representing points $p_r$ and $p_i$. Likewise, as described above, the set of fourth feature distances may be determined using any other suitable equation, such as by calculating a straight dot product of each pair of vectors, by calculating a cross-product of each pair of vectors, by adding each pair of vectors, by subtracting each pair of vectors, etc. In some aspects, the equation used to calculate the set of fourth feature distances may be different than the equation used to calculate the first, second, and/or third feature distances.

In step 506, the processing system determines a set of third geodesic distances between the sixth point as represented in the first surface map, and all other points of the first image as represented in the first surface map. Here as well, the sixth point represented in the first surface map will correspond to point $p_r$ in the first image. Thus, the set of third geodesic distances will include a separate geodesic distance $g(p_r,p_i)$ for every point $p_i$ of the first image representing the distance along the 3D surface of the first surface map between the points corresponding to point $p_r$ and $p_i$ of the first image.

In step 508, the processing system determines a third loss value of the set of loss values, the third loss value being based on the set of fourth feature distances and the set of third geodesic distances. For example, the third loss value may act to push feature distances between non-matching points apart, depending on the geodesic distances between those pixels. Here as well, this third loss value may be determined according to any suitable equation. For example, the third loss value may be based on a difference between each geodesic distance in the set of third geodesic distances and each corresponding feature distance in the set of fourth feature distances. In some aspects of the technology, the set of third geodesic distances and the set of fourth feature distances may be measured between a selected reference point (or pixel), and every other point (or pixel) in the first image. In that regard, the third loss value may be a dense geodesic loss value $L_d$ calculated according to Equation 6 below for a selected point $p_r$ and every point $p_i$ (out of n total points) in the first image.

$$L_d = \sum_{p_t=1}^{n} \log(1 + \exp(g(p_r, p_t) - d(p_r, p_t)) \quad (6)$$

Likewise, the third loss value may be based on more than one selected point $p_r$ in the first image. Thus, the third loss value may be a value, vector, or tensor which is based on the loss value $L_d$ calculated according to Equation 6 using the set of fourth feature distances and the set of third geodesic distances, as well as additional loss values $L_d$ calculated for other randomly selected points $p_r$. For example, the third loss value may be an average of the loss values $L_d$ calculated for a predetermined number of randomly selected points point $p_r$, e.g., 1, 5, 16, 128, etc. Likewise, the third loss value may be determined by concatenating the loss values $L_d$ calculated for a predetermined number of randomly selected points $p_r$.

In step 510, the processing system performs step 422 of method 400b using the resulting set of loss values, as described above. In this case, the set of loss values includes the first and second loss values determined in steps 410 and 420 as well as the third loss value determined in step 508. Here again, the set of loss values may be used in any suitable manner to influence the modification of the one or more parameters of the neural network. In that regard, the processing system may sum the first, second, and third loss values to arrive at a total loss value, and modify the predictive model's parameters based on that total loss value. Likewise, the first, second, and third loss values may be multiplied by one or more preselected weighting factors (e.g., a specific $w_c$, $w_s$, and $w_d$ value) before being combined to form the total loss value.

Figure 6:
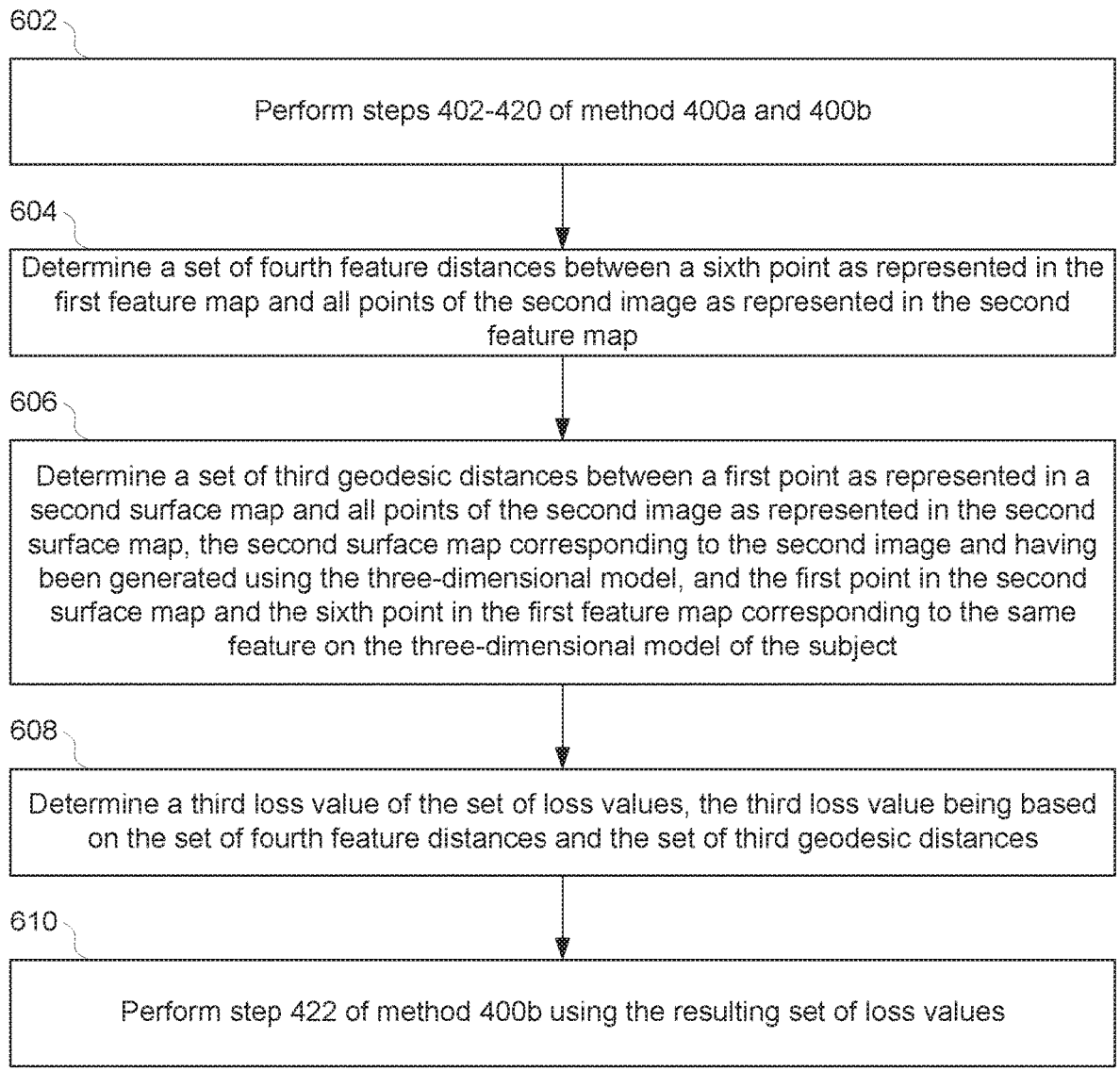
FIG. 6 is a flow diagram showing an exemplary method for determining an additional loss value for combination with the loss values of method 400a, 400b of FIGS. 4A, 4B, according to aspects of the present technology.

FIG. 6 depicts an exemplary method 600 of determining an additional loss value for combination with the loss values of method 400a, 400b of FIG. 4. In that regard, in step 602, the processing system performs steps 402-420 of method 400a and 400b, as described above.

In step 604, the processing system determines a set of fourth feature distances between a sixth point as represented in the first feature map and all points of the second image as represented in the second feature map. The "sixth point" and "set of fourth feature distances" described with respect to method 600 are not the same as those described in the context of the method 500 of FIG. 5. In method 600, the sixth point may be any randomly selected reference point $p_r$ in the first image. In some aspects, the processing system may be configured to select a reference point $p_r$ which is visible in the first image, but which is not visible in the second image. For example, where the first and second images are of a human subject walking, the reference point $p_r$ may correspond to a point on the subject's left leg which is visible in the first image, but which is covered by the subject's right leg in the second image and thus not visible in the second image. Configuring the processing system to select a reference point $p_r$ that is not visible in the second image may allow the neural network to learn how the points of the second image may correspond to points which are only visible in the first image (e.g., due to differences in the way the subject was posed in both images, camera position, lighting, etc.). Here again, the label $p_r$ is used for convenience, and does not indicate that this selected reference point must be the same as the reference point used in step 412 of method 400b.

If each point of the first image is represented as a vector in the first feature map, and each point of the second image in the second feature map, then the set of fourth feature distances may be determined as described above with respect to Equation 2. In that regard, the set of fourth feature distances will include a separate feature distance $d(p_r, p_t)$ for every point $p_r$ of the second image, calculated using the vectors representing points $p_r$ and $p_t$. Likewise, as described above, the set of fourth feature distances may be determined using any other suitable equation, such as by calculating a straight dot product of each pair of vectors, by calculating a cross-product of each pair of vectors, by adding each pair of vectors, by subtracting each pair of vectors, etc. In some aspects, the equation used to calculate the set of fourth feature distances may be different than the equation used to calculate the first, second, and/or third feature distances.

In step 606, the processing system determines a set of third geodesic distances between a first point as represented in a second surface map and all points of the second image as represented in the second surface map. The second surface map corresponds to the second image, having been generated using the 3D model of the subject in the same pose used to generate the second image. In addition, the first point in the second surface map and the sixth point in the first feature map correspond to the same feature on the 3D model of the subject. For example, as noted above, the first point in the second surface map may correspond to a point on the left leg of the subject which is visible in the first image, and thus represented in the first feature map, but which is not visible in the second image, and thus not represented in second feature map. Thus, using the exemplary points called out in the description of step 604, the first point represented in the second surface map will correspond to point $p_r$ represented in the first image. In such a case, the set of third geodesic distances will include a separate geodesic distance $g(corr(p_r),p_t)$ for every point $p_t$ of the second image representing the distance along the 3D surface of the second surface map between the point which corresponds to point $p_r$ of the first image (referred to here as $corr(p_r)$) and the point which corresponds to point $p_t$ of the second image.

In step 608, the processing system determines a third loss value of the set of loss values, the third loss value being based on the set of fourth feature distances and the set of third geodesic distances. Here as well, the "third loss value" described with respect to method 600 is not the same as that described in the context of the method 500 of FIG. 5. In that regard, the third loss value of method 600 may also act to push feature distances between non-matching points apart depending on the geodesic distances between those pixels, and may be based on a difference between each geodesic distance in the set of third geodesic distances and each corresponding feature distance in the set of fourth feature distances. However, because the "third loss value" of method 600 will be based on different sets of "third geodesic distances" and "fourth feature distances" as described above with respect to steps 604 and 606, it will differ from the "third loss value" described in method 500 of FIG. 5. Here again, the third loss value of method 600 may be determined according to any suitable equation. For example, the third loss value may be a cross-view geodesic loss value $L_{cd}$ calculated according to Equation 7 below for a selected point $p_r$ of the first image and every point $p_t$ (out of n total points) in the second image.

$$L_{cd} = \sum_{p_t=1}^{n} \log(1 + \exp(g(corr(p_r), p_t) - d(p_r, p_t))) \qquad (7)$$

Likewise, the third loss value may be based on more than one selected point $p_r$ in the first image. Thus, the third loss value may be a value, vector, or tensor which is based on the loss value $L_{cd}$ calculated according to Equation 7 using the set of fourth feature distances and the set of third geodesic distances, as well as additional loss values $L_{cd}$ calculated for other randomly selected points $p_r$. For example, the third loss value may be an average of the loss values $L_{cd}$ calculated for a predetermined number of selected points point $p_r$, e.g., 1, 5, 16, 128, etc. Likewise, the third loss value may be determined by concatenating the loss values $L_{cd}$ calculated for a predetermined number of selected points $p_r$.

In step 610, the processing system performs step 422 of method 400b using the resulting set of loss values, as described above. In this case, the set of loss values includes the first and second loss values determined in steps 410 and 420 of FIG. 4, as well as the third loss value determined in step 608. Here again, the set of loss values may be used in any suitable manner to influence the modification of the one or more parameters of the neural network. In that regard, the processing system may sum the first, second, and third loss values to arrive at a total loss value, and modify the predictive model's parameters based on that total loss value. Likewise, the first, second, and third loss values may be multiplied by one or more preselected weighting factors (e.g., a specific $w_c$, $w_s$, and $w_{cd}$ value) before being combined to form the total loss value.

FIG. 7 depicts an exemplary method 700 of determining an additional loss value for combination with the loss values of methods 400a, 400b, and 500 of FIGS. 4 and 5. In that regard, method 700 results in a "fourth loss value" which is identical to the loss value determined in method 600 of FIG. 6, but which is to be combined with the loss values calculated in methods 400a, 400b, and 500. Thus, in step 702, the processing system performs steps 402-420 of method 400a and 400b, and steps 504-508 of method 500, as described above.

In step 704, the processing system determines a set of fifth feature distances between a seventh point as represented in the first feature map and all points of the second image as represented in the second feature map. Here as well, the seventh point may be any randomly selected reference point $p_r$ in the first image. In some aspects, the processing system may be configured to select a reference point $p_r$ which is visible in the first image, but which is not visible in the second image. For example, where the first and second images are of a human subject walking, the reference point $p_r$ may correspond to a point on the subject's left leg which is visible in the first image, but which is covered by the subject's right leg in the second image and thus not visible in the second image. Again, configuring the processing system to select a reference point $p_r$ that is not visible in the second image may allow the neural network to learn how the points of the second image may correspond to points which are only visible in the first image (e.g., due to differences in the way the subject was posed in both images, camera position, lighting etc.). Here as well, the label $p_r$ is used for convenience, and does not indicate that this selected reference point must be the same as the reference point used in step 412 of method 400b or step 504 of method 500.

If each point of the first image is represented as a vector in the first feature map, and each point of the second image is represented as a vector in the second feature map, then the set of fifth feature distances may be determined as described above with respect to Equation 2. In that regard, the set of fifth feature distances will include a separate feature distance $d(p_r, p_i)$ for every point $p_i$ of the second image, calculated using the vectors representing points $p_r$ and $p_i$. Likewise, as described above, the set of fifth feature distances may be determined using any other suitable equation, such as by calculating a straight dot product of each pair of vectors, by calculating a cross-product of each pair of vectors, by adding each pair of vectors, by subtracting each pair of vectors, etc. In some aspects, the equation used to calculate the set of fifth feature distances may be different than the equation used to calculate the first, second, third, and/or fourth feature distances.

In step 706, the processing system determines a set of fourth geodesic distances between a first point as represented in a second surface map and all points of the second image as represented in the second surface map. Here as well, the second surface map corresponds to the second image, having been generated using the 3D model of the subject in the same pose used to generate the second image. In addition, the first point in the second surface map and the seventh point in the first feature map correspond to the same feature on the 3D model of the subject. For example, as noted above, the first point in the second surface map may correspond to a point on the left leg of the subject which is visible in the first image, and thus represented in the first feature map, but which is not visible in the second image, and thus not represented in second feature map. Thus, using the exemplary points called out in the description of step 704, the first point represented in the second surface map will correspond to point $p_r$ represented in the first image. In such a case, the set of fourth geodesic distances will include a separate geodesic distance $g(corr(p_r),p_i)$ for every point $p_i$ of the second image representing the distance along the 3D surface of the second surface map between the point which corresponds to point $p_r$ of the first image (referred to here as $corr(p_r)$) and the point which corresponds to point $p_i$ of the second image.

In step 708, the processing system determines a fourth loss value of the set of loss values, the fourth loss value being based on the set of fifth feature distances and the set of fourth geodesic distances. The fourth loss value of method 600 may be determined according to any suitable equation. For example, the fourth loss value may be a cross-view geodesic loss value $L_{cd}$ calculated according to Equation 7 above for a selected point $p_r$ of the first image and every point $p_i$ (out of n total points) in the second image.

Likewise, the fourth loss value may be based on more than one selected point $p_r$ in the first image. Thus, the fourth loss value may be a value, vector, or tensor which is based on the loss value $L_{cd}$ calculated according to Equation 7 using the set of fifth feature distances and the set of fourth geodesic distances, as well as additional loss values $L_{cd}$ calculated for other randomly selected points $p_r$. For example, the fourth loss value may be an average of the loss values $L_d$ calculated for a predetermined number of selected points point $p_r$, e.g., 1, 5, 16, 128, etc. Likewise, the fourth loss value may be determined by concatenating the loss values $L_{cd}$ calculated for a predetermined number of selected points $p_r$.

In step 710, the processing system performs step 422 of method 400b using the resulting set of loss values, as described above. In this case, the set of loss values includes the first and second loss values determined in steps 410 and 420 of FIG. 4, the third loss value determined in step 508 of FIG. 5, and the fourth loss value determined in step 708. Here again, the set of loss values may be used in any suitable manner to influence the modification of the one or more parameters of the neural network. In that regard, the processing system may sum the first, second, third, and fourth loss values to arrive at a total loss value, and modify the predictive model's parameters based on that total loss value. Likewise, the first, second, third, and fourth loss values may be multiplied by one or more preselected weighting factors (e.g., a specific $w_c$, $w_s$, $w_d$, and $w_{cd}$ value) before being combined to form the total loss value.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many

The invention claimed is:

1. A method of training a neural network to predict correspondences in images, the method comprising:
generating, by one or more processors of a processing system and using the neural network, a first feature map based on a first image of a subject, and a second feature map based on a second image of the subject, the first image and the second image being different and having been generated using a three-dimensional model of the subject;
determining, by the one or more processors, a first feature distance between a first point as represented in the first feature map and a second point as represented in the second feature map, the first point and the second point corresponding to the same feature on the three-dimensional model of the subject;
determining, by the one or more processors, a second feature distance between a third point as represented in the first feature map and a fourth point as represented in the first feature map;
determining, by the one or more processors, a first geodesic distance between the third point and the fourth point as represented in a first surface map, the first surface map corresponding to the first image and having been generated using the three-dimensional model of the subject;
determining, by the one or more processors, a third feature distance between the third point as represented in the first feature map and a fifth point as represented in the first feature map;
determining, by the one or more processors, a second geodesic distance between the third point and the fifth point as represented in the first surface map;
determining, by the one or more processors, a first loss value of a set of loss values, the first loss value being based on the first feature distance;
determining, by the one or more processors, a second loss value of the set of loss values, the second loss value being based on the second feature distance, the third feature distance, the first geodesic distance, and the second geodesic distance; and
modifying, by the one or more processors, one or more parameters of the neural network based at least in part on the set of loss values.

2. The method of claim 1, wherein the first loss value is further based on a set of additional feature distances, each given feature distance of the set of additional feature distances being between a selected point as represented in the first feature map and a corresponding point as represented in the second feature map, the selected point and the corresponding point corresponding to the same feature on the three-dimensional model of the subject.

3. The method of claim 2, wherein the first point and each selected point collectively represent all pixels in the first image.

4. The method of claim 1, wherein the second loss value is further based on at least one additional pair of feature distances and at least one additional pair of geodesic distances,
each given additional pair of feature distances of the at least one additional pair of feature distances comprising two feature distances between a set of three selected points as represented in the first feature map, and
each given additional pair of geodesic distances of the at least one additional pair of geodesic distances comprising two geodesic distances between the set of three selected points as represented in the first surface map.

5. The method of claim 1, further comprising:
determining, by the one or more processors, a set of fourth feature distances between a sixth point as represented in the first feature map and all other points of the first image as represented in the first feature map;
determining, by the one or more processors, a set of third geodesic distances between the sixth point as represented in the first surface map, and all other points of the first image as represented in the first surface map; and
determining, by the one or more processors, a third loss value of the set of loss values, the third loss value being based on the set of fourth feature distances and the set of third geodesic distances.

6. The method of claim 5, wherein the third loss value is further based on at least one additional set of feature distances and at least one additional set of geodesic distances,
each given additional set of feature distances of the at least one additional set of feature distances being between a selected point as represented in the first feature map and all other points of the first image as represented in the first feature map, and
each given additional set of geodesic distances of the at least one additional set of geodesic distances being between the selected point as represented in the first surface map and all other points of the first image as represented in the first surface map.

7. The method of claim 1, further comprising:
determining, by the one or more processors, a set of fourth feature distances between a sixth point as represented in the first feature map and all points of the second image as represented in the second feature map;
determining, by the one or more processors, a set of third geodesic distances between a first point as represented in a second surface map and all points of the second image as represented in the second surface map, the second surface map corresponding to the second image and having been generated using the three-dimensional model of the subject, and the first point in the second surface map and the sixth point in the first feature map corresponding to the same feature on the three-dimensional model of the subject; and
determining, by the one or more processors, a third loss value of the set of loss values, the third loss value being based on the set of fourth feature distances and the set of third geodesic distances.

8. The method of claim 7, wherein the third loss value is further based on at least one additional set of feature distances and at least one additional set of geodesic distances,
each given additional set of feature distances of the at least one additional set of feature distances being between a selected point as represented in the first feature map and all points of the second image as represented in the second feature map, and
each given additional set of geodesic distances of the at least one additional set of geodesic distances being between a corresponding point as represented in a second surface map and all points of the second image as represented in the second surface map, the corresponding point in the second surface map and the selected point in the first feature map corresponding to the same feature on the three-dimensional model of the subject.

9. The method of claim 5, further comprising:
determining, by the one or more processors, a set of fifth feature distances between a seventh point as represented in the first feature map and all points of the second image as represented in the second feature map;
determining, by the one or more processors, a set of fourth geodesic distances between a first point as represented in a second surface map and all points of the second image as represented in the second surface map, the second surface map corresponding to the second image and having been generated using the three-dimensional model of the subject, and the first point in the second surface map and the seventh point in the first feature map corresponding to the same feature on the three-dimensional model of the subject; and
determining, by the one or more processors, a fourth loss value of the set of loss values, the fourth loss value being based on the set of fifth feature distances and the set of fourth geodesic distances.

10. The method of claim 7, wherein the first point as represented in the second surface map corresponds to a feature on the three-dimensional model of the subject that is not represented in the second feature map.

11. The method of claim 1, the method further comprising the one or more processors generating at least one of the first image, the second image, or the first surface map.

12. The method of claim 7, the method further comprising the one or more processors generating at least one of the first image, the second image, the first surface map, or the second surface map.

13. The method of claim 9, the method further comprising the one or more processors generating at least one of the first image, the second image, the first surface map, or the second surface map.

14. The method of claim 1, wherein the subject is a human or a representation of a human.

15. The method of claim 14, wherein the subject is in a different pose in the first image than in the second image.

16. The method of claim 14, wherein the first image is generated from a different perspective of the three-dimensional model of the subject than the second image.

17. A processing system comprising:
a memory storing a neural network; and
one or more processors coupled to the memory and configured to use the neural network to predict correspondences in images,
wherein the neural network has been trained to predict correspondences in images pursuant to a training method comprising:
generating a first feature map based on a first image of a subject, and a second feature map based on a second image of the subject, the first image and the second image being different and having been generated using a three-dimensional model of the subject;
determining a first feature distance between a first point as represented in the first feature map and a second point as represented in the second feature map, the first point and the second point corresponding to the same feature on the three-dimensional model of the subject;
determining a second feature distance between a third point as represented in the first feature map and a fourth point as represented in the first feature map;
determining a first geodesic distance between the third point and the fourth point as represented in a first surface map, the first surface map corresponding to the first image and having been generated using the three-dimensional model of the subject;
determining a third feature distance between the third point as represented in the first feature map and a fifth point as represented in the first feature map;
determining a second geodesic distance between the third point and the fifth point as represented in the first surface map;
determining a first loss value of a set of loss values, the first loss value being based on the first feature distance;
determining a second loss value of the set of loss values, the second loss value being based on the second feature distance, the third feature distance, the first geodesic distance, and the second geodesic distance; and
modifying one or more parameters of the neural network based at least in part on the set of loss values.

18. The processing system of claim 17, wherein the neural network has been trained to predict correspondences in images pursuant to a training method further comprising:
determining a set of fourth feature distances between a sixth point as represented in the first feature map and all other points of the first image as represented in the first feature map;
determining a set of third geodesic distances between the sixth point as represented in the first surface map, and all other points of the first image as represented in the first surface map; and
determining a third loss value of the set of loss values, the third loss value being based on the set of fourth feature distances and the set of third geodesic distances.

19. The processing system of claim 17, wherein the neural network has been trained to predict correspondences in images pursuant to a training method further comprising:
determining a set of fourth feature distances between a sixth point as represented in the first feature map and all points of the second image as represented in the second feature map;
determining a set of third geodesic distances between a first point as represented in a second surface map and all points of the second image as represented in the second surface map, the second surface map corresponding to the second image and having been generated using the three-dimensional model of the subject, and the first point in the second surface map and the sixth point in the first feature map corresponding to the same feature on the three-dimensional model of the subject; and
determining a third loss value of the set of loss values, the third loss value being based on the set of fourth feature distances and the set of third geodesic distances.

20. The processing system of claim 18, wherein the neural network has been trained to predict correspondences in images pursuant to a training method further comprising:
determining a set of fifth feature distances between a seventh point as represented in the first feature map and all points of the second image as represented in the second feature map;
determining a set of fourth geodesic distances between a first point as represented in a second surface map and all points of the second image as represented in the second surface map, the second surface map corresponding to the second image and having been generated using the three-dimensional model of the subject, and the first point in the second surface map and the seventh point in the first feature map corresponding to the same feature on the three-dimensional model of the subject; and determining a fourth loss value of the set of loss values, the fourth loss value being based on the set of fifth feature distances and the set of fourth geodesic distances.

\* \* \* \* \*